(12) United States Patent
Smith

(10) Patent No.: US 6,526,017 B1
(45) Date of Patent: Feb. 25, 2003

(54) MEDIA CARTRIDGE RETENTION AND EJECTION SYSTEM

(75) Inventor: Mark A. Smith, Holdrege, NE (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/561,141

(22) Filed: Apr. 28, 2000

(51) Int. Cl.[7] .............................................. G11B 15/68
(52) U.S. Cl. ................................................. 369/178.01
(58) Field of Search ........................... 369/178.01, 177, 369/256

(56) References Cited

U.S. PATENT DOCUMENTS

| | | | | |
|---|---|---|---|---|
| 5,163,037 A | * | 11/1992 | Ohmori et al. ............ 369/77.2 |
| 5,231,552 A | | 7/1993 | Schneider et al. | |
| 5,576,911 A | * | 11/1996 | Porter ...................... 360/98.06 |
| 5,781,368 A | * | 7/1998 | Kotaki et al. ................ 360/92 |
| 5,979,755 A | * | 11/1999 | Chaya ......................... 235/383 |
| 6,038,099 A | * | 3/2000 | Heinze et al. ................. 360/92 |
| 6,042,205 A | * | 3/2000 | Coffin et al. ............. 312/332.1 |
| 6,160,678 A | * | 12/2000 | Meikle et al. ................. 360/92 |

* cited by examiner

Primary Examiner—Allen Cao
Assistant Examiner—Dzung C. Nguyen
(74) Attorney, Agent, or Firm—David M. Mason

(57) ABSTRACT

In general, the present invention provides a cartridge positioning mechanism for securing and ejecting media cartridges being contained by a magazine that is fixably mounted within the cavity of an autochanger. More specifically, a rocker arm pivotally coupled to a rear portion of a magazine and a control spring, having a lift and logic component, controls the rocker arm to secure a cartridge being received within the magazine and eject a cartridge that needs to be removed. This inventive magazine structure will provide a "push to insert" and "push to eject" process for securing and removing a cartridge from a hard to reach magazine being permanently attached within a cavity of a conventional autochanger.

29 Claims, 11 Drawing Sheets

MEDIA CARTRIDGE RETENTION AND EJECTION SYSTEM

BACKGROUND OF THE INVENTION

1. Field of the Invention

This invention relates in general to a media holding device for use in an autochanger, and more particularly to a magazine incorporating a retention and ejection system that is fixed within an autochanger library assembly.

2. Description of the Related Art

Autochangers are devices that read/write data from/to media pieces. The media pieces or cartridges are stored in a plurality of storage slots, sometimes referred to as a library, which are located within the physical structure of the autochanger. At least one media "player" or "drive" is also located within the physical structure of the autochanger and serves to read and write data from and to the media pieces. A media handling device, often referred to herein simply as a picker, is also located within the autochanger and serves to transport the media pieces between the library and the media player. Autochangers may be adapted to operate with several different media formats, thus "media cartridges" may comprise optical discs, magnetic discs, and magnetic tapes, e.g., digital linear tapes, CD's etc.

Referring to FIG. 1, a cutaway view of a conventional library 110 illustrates a fixed magazine 112 for storing a media cartridge 114. The magazine 112 is located deep within a cavity 116 of the library 110, approximately 15 to 25 inches, and within close proximity to other parts 118 (e.g., media drive) and the interior walls of the library 110. Each media cartridge 114 is stored within a holding location or slot 120 of the magazine 112 until the picker or the user (not shown) removes them while the library door 122 is closed.

Since the magazine 112 is fixably mounted deep within the library 110, the process of inserting/removing a cartridge 114 into/from the magazine 112 is a difficult task. In particular, to insert a cartridge 114 a user must blindly reach their hand (not shown), which would be grasping a media cartridge 114, into the library cavity 116 until a front portion of the media cartridge 114 contacts a front portion of the magazine 112, or at least another part 118 of the library. Next, the user rotates and slides the cartridge up, down and side-to-side, while applying a slight force, until a slot 120 of the magazine 112 is located that has not already been filled. Finally, the user inserts the cartridge 114 with a force of one to three pounds into the slot 120 until it locks in place by a conventional detent mechanism (not shown) of the magazine 112.

To resolve some of the difficulty of inserting a cartridge 114 into the autochanger library 110 described above, a small window (not shown) may be located in a wall of the autochanger library to allow light into the cavity 116 adjacent the magazine 112. The light will help the insertion process if there is room in the autochanger system for a user's head to either look through the window or down the length of the cavity as a cartridge is being inserted.

As above, the first step for the manual removal of a cartridge 114 from the magazine 112 involves the user blindly reaching their hand into the cavity 116 of the library 110 to detect the magazine 112 and the cartridge 114 contained therein. However, the insufficient space between neighboring cartridges 114 and above or below each cartridge 114 because of other components contained by the autochanger cavity 116 or its ceiling makes the detection of a cartridge very difficult. In turn, the same limited space nearly prevents the user's fingers from being able to grasp any side of the cartridge. Consequently, the process of pulling out a cartridge, assuming a cartridge can be grasped while trying to overcome the retention force created by a detent mechanism of the magazine, is nearly impossible.

Therefore, a need exists for a fixed magazine of an autochanger library to provide a compact insertion and ejection mechanism that will allow a user to easily exchange cartridges within the magazine.

SUMMARY OF THE INVENTION

In one aspect of the present invention, an autochanger device provides a cavity having a magazine being fixably mounted deep within the cavity. The device includes a rocker arm having a logic path and a spring mechanism having a lift element and a logic finger. The rocker arm is coupled to the magazine at a pivot point, the lift element is coupled between the magazine and the pivot point, and the logic finger is coupled between the magazine and the logic path such that the location of the logic finger within the logic path controls the position of a media cartridge within the magazine.

In another aspect of the present invention, a media cartridge is securing and/or ejecting within a magazine of an autochanger. The cartridge includes a pivotal door and a tab for opening the door. The method comprises the steps of positioning the cartridge within a portion of the magazine to interact with a rocker arm being pivotally coupled to the magazine and having a guide path, the magazine also includes a spring mechanism coupled between the magazine and the rocker arm and having a lift element and a guide finger; and applying a force to the cartridge to rotate a distal end of the rocker arm and move a portion of the guide finger into a first region of the guide path so that the lift element applies a force to pivot the rocker arm.

BRIEF DESCRIPTION OF THE DRAWINGS

Other aspects and advantages of the invention will become apparent upon reading the following detailed description and upon reference to the drawings, in which.

Figure 1:
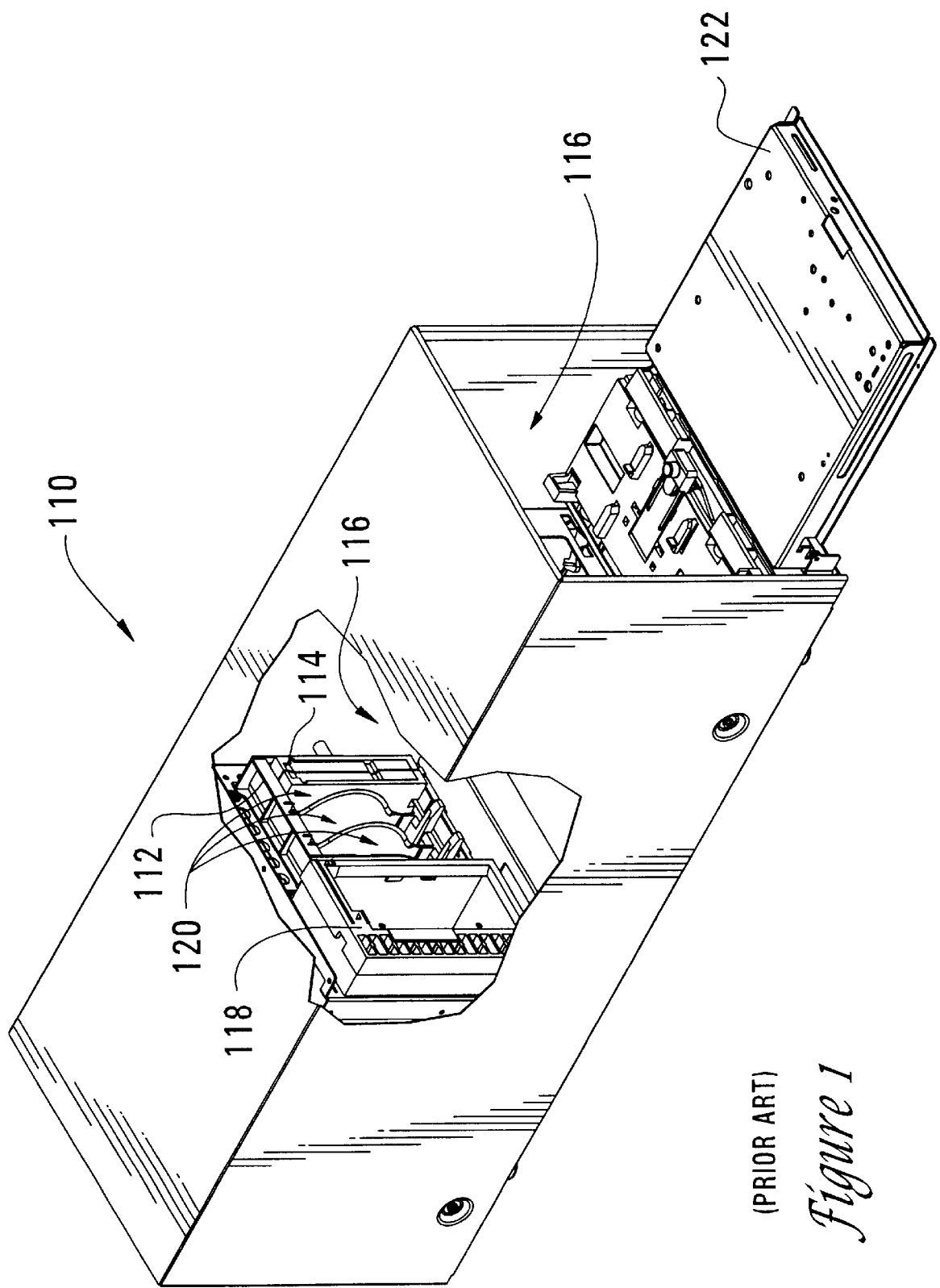
FIG. 1 illustrates a perspective cutaway view of a conventional autochanger library containing a fixed magazine having a media cartridge.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention provides a cartridge positioning mechanism for securing and ejecting media cartridges being contained by a magazine that is fixably mounted within the cavity of an autochanger. More specifically, a rocker arm pivotally coupled to a rear portion of a magazine and a control spring, having a lift and logic component, controls the rocker arm to secure a cartridge being received within the magazine and eject a cartridge that needs to be removed. This inventive magazine structure will provide a "push to insert" and "push to eject" process for securing and removing a cartridge from a hard to reach magazine being permanently attached within a cavity of a conventional autochanger.

For detail regarding known library structures, magazines, detent mechanisms and the autochangers that contain them, the following references are all incorporated herein for all that they disclose: U.S. patent application Ser. No. 09/290, 926, now U.S. Pat. No. 6,246,642, filed Apr. 13, 1999 for "AUTOMATED OPTICAL DETECTION SYSTEM AND METHOD" of Gardner; U.S. patent application Ser. No. 09/291,242, filed Apr. 13, 1999 for "GUIDANCE SYSTEM AND METHOD FOR AN AUTOMATED MEDIA EXCHANGER" of Gardner et al.; U.S. patent application Ser. No. 09/179,793, filed Oct. 27, 1998 for "MAIL SLOT DATA CARTRIDGE EXCHANGE SYSTEM FOR USE WITH A DATA STORAGE SYSTEM" of Thayer, et al.; and U.S. patent application Ser. No. 09/257,322, filed Feb. 25, 1999 for "DATA CARTRIDGE EXCHANGE APPARATUS" of Mueller et al.

Figure 2A:
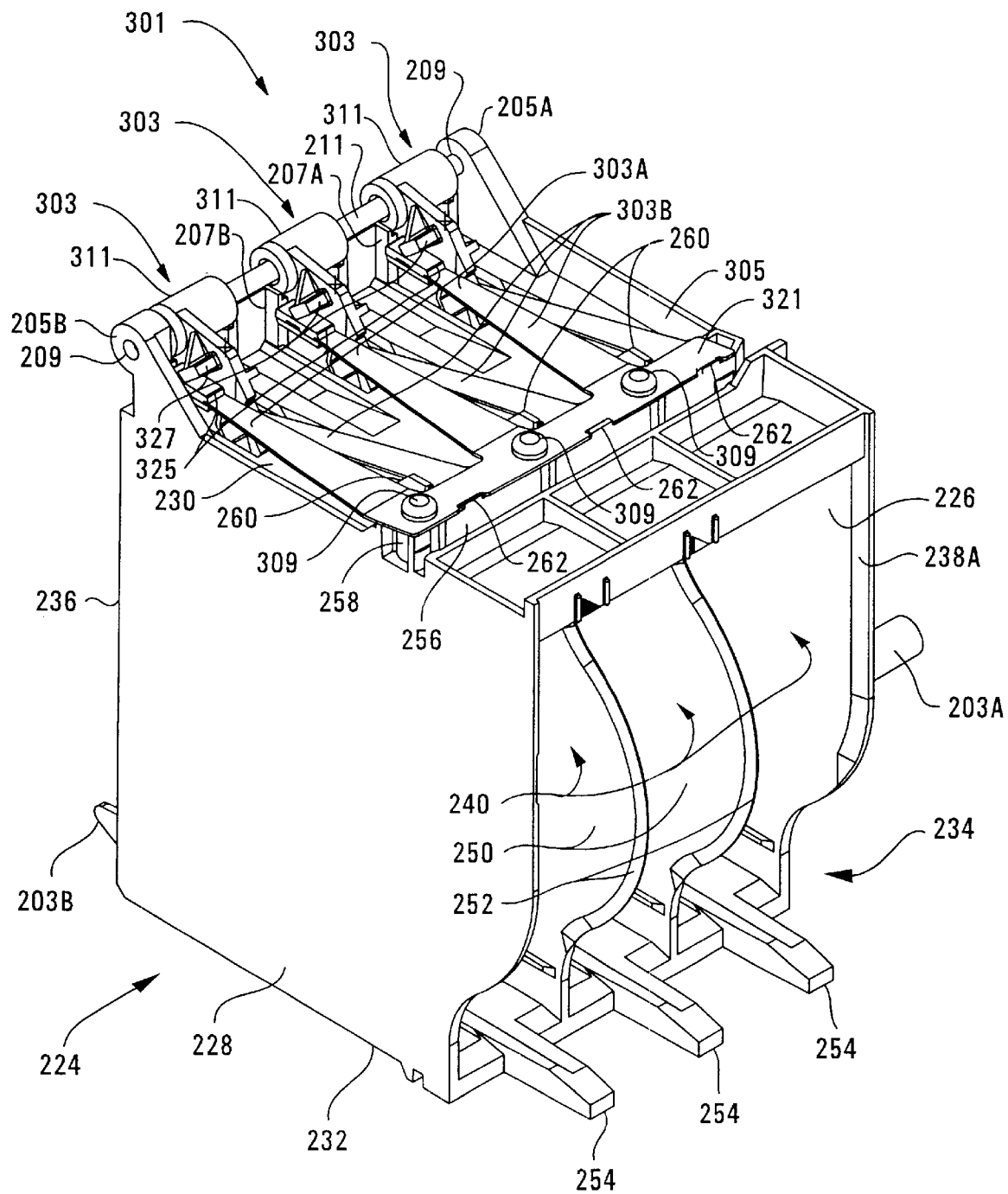
FIGS. 2A and 2B illustrate a front and a back perspective view of the inventive magazine structure having a cartridge positioning mechanism in accordance with a first embodiment of the present invention.
Figure 2B:
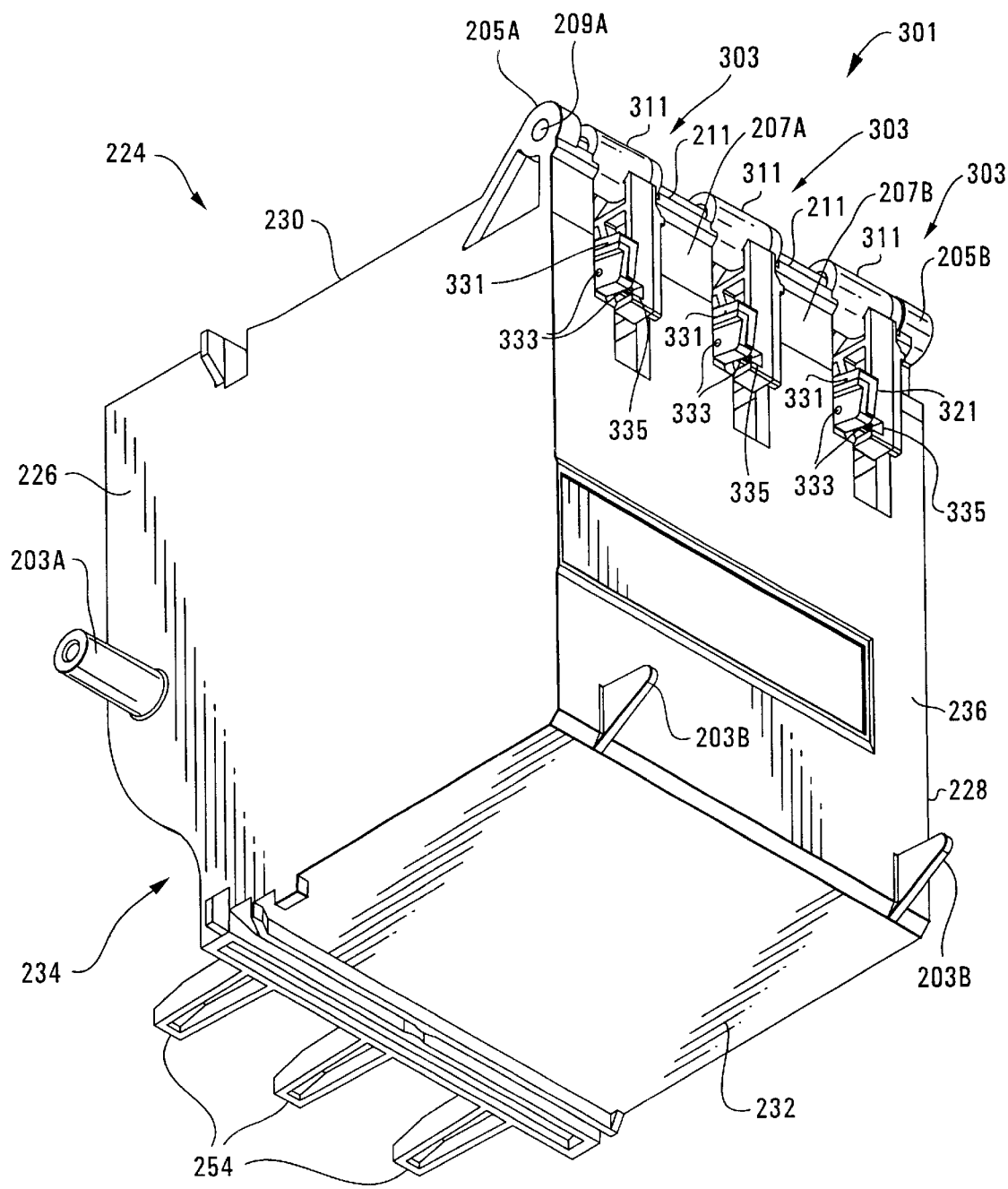
Figure 3:
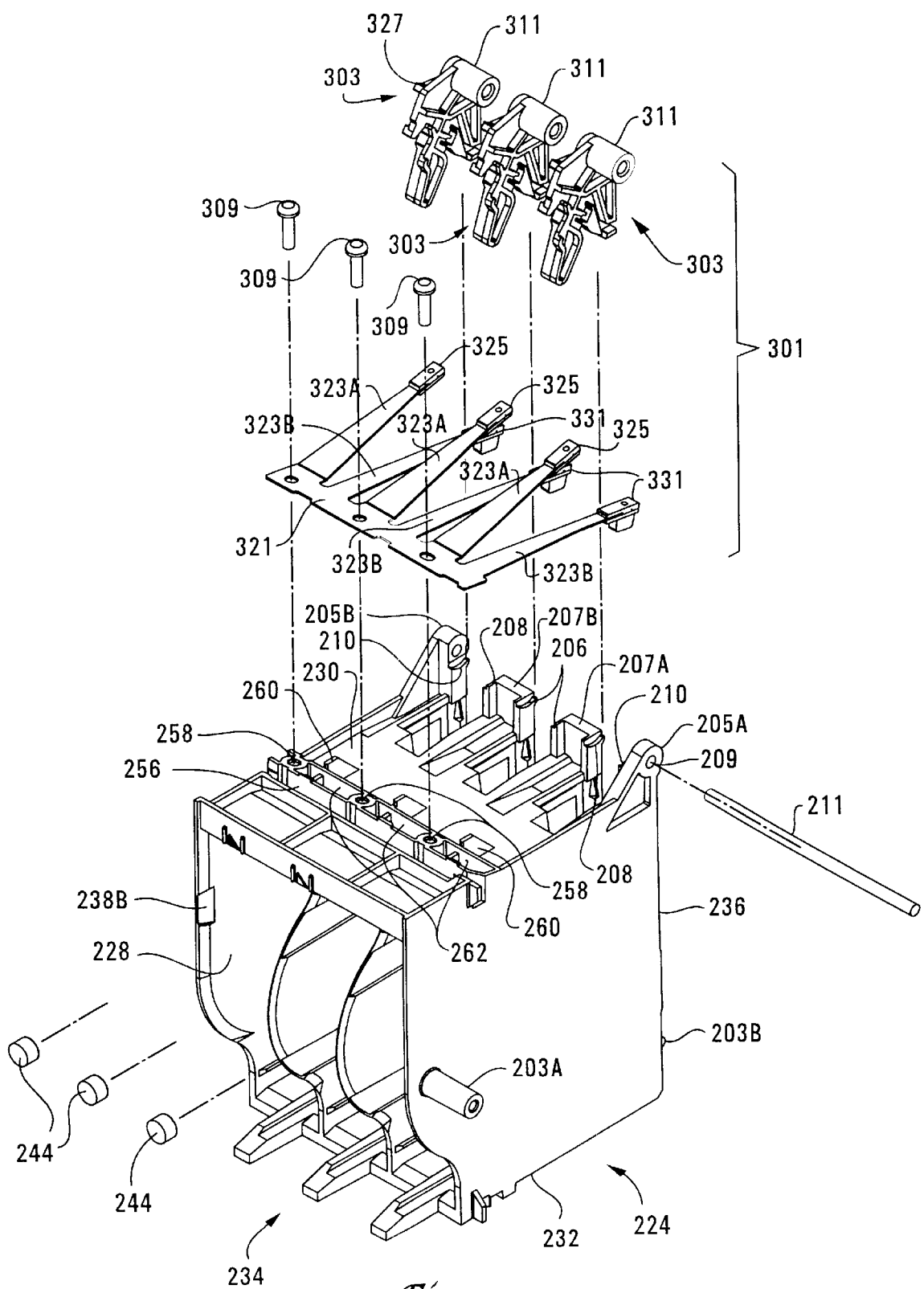
FIG. 3 illustrates an exploded front perspective view of the magazine of FIG. 2A.

Referring now to the drawings, FIGS. 2A, 2B and 3 illustrate a front, a back and an exploded perspective view of the inventive magazine structure 201 having a cartridge positioning mechanism ("CPM") in accordance with a first embodiment. The inventive magazine structure 201 can be fixably mounted within a conventional autochanger 110 as illustrated in FIG. 1. In addition, similar to the conventional magazine 112 of FIG. 1, the inventive magazine structure 201 of FIG. 2 is adapted to store three media pieces 114. It is to be understood, however, that the inventive magazine 201 may be modified to store more or less media cartridges, and the components thereof, to be described below, maybe adapted to store other forms of media. In particular, the "media" cartridges may comprise optical discs, magnetic discs, and magnetic tapes, e.g., digital linear tapes, CD's etc.

In general, the inventive magazine 201 includes a CPM 301 having a rocker arm 303 and a control spring 305 functionally coupled to the magazine 201 to interact with a media cartridge (not shown), such as a digital linear tape, being contained by the magazine 201. The magazine 201 provides a housing 224 to which the CPM 301 is attached. The housing 224 includes a right portion 226, a left portion 228, a top portion 230, a bottom portion 232, a front portion 234, and a back portion 236. The right portion 226 extends from the back portion 236 toward the proximity of the front portion 234 and forms an edge 238A. Likewise, the left portion 228 extends from the back portion 236 toward the proximity of the front portion 234 and forms another edge 238B (see FIG. 3).

The front portion 234 defines a plurality of slots 240, sometimes referred to herein as media holding locations or bays. The slots 240 may be formed by coupling a plurality of spaced dividers 250 within the housing 224, wherein the dividers 250 are parallel to the right and left portions 226 and 228. The dividers 250 may have beveled edges 252 that help serve to guide the media pieces into the slots 240. The slots 240 may have inclined receiving tabs 254 on the bottom portion 232 that extend from the back portion 236 toward the proximity of the front portion 234 and serve to guide the media pieces into the slots 240.

The housing 224 provides a securing tab 203A and lead-in rails 203B to assist with the insertion and attachment of the magazine 201 within the cavity of an autochanger. In particular, the right portion 226 of the housing 224, adjacent the front portion 234, provides a securing tab 203A that extends laterally away from the right portion 226. The securing tab 203A may be secured to the cavity 116 of an autochanger 110 by a known method to replace the conventional magazine 112 of FIG. 1. The bottom portion 232, adjacent the right and left portion 226 and 228, may also provide lead-in rails 203B. The lead-in rails assist the placement of other components that may reside below or behind the magazine. As illustrated in FIG. 3 and process FIGS. 5A–5F, each slot 240 of the magazine 201 may also include spring pads 244 attached to an interior surface of the back portion 236. These pads 244 can absorb a cartridge being inserted and provide an additional ejecting force.

The housing 224 also includes various components to secure the rocker arm 303 and control spring 305 to the top portion 230 of the magazine 201. In particular, the right and left portion 226 and 228 provide right and left hinges 205A and 205B and cradles 207A and 207B that reside adjacent the back portion 236. These hinges 205A and 205B include a hole 209 formed in a top central region to receive a rocker arm pin 211 that pivotally secures each rocker arm 303 to the housing 224.

As illustrated, the right and left hinges 205A and 205B and cradles 207A and 207B extend upward beyond the surface of the top housing portion 230. The height of each cradle 207A and 207B is less than the height of each hinge 205A and 205B by the outside diameter of a sleeve portion 311 of each rocker arm 303. The structure of the right and left hinges 205A and 205B and cradles 207A and 207B position a portion of the rocker arms above the housing 224, while leaving another portion that can move in and out of the housing 224 to interact with a media cartridge (not shown). The pin 211 passing through the hole 209 of the right hinge 205A, each rocker arm sleeve portion 311, and the hole 209 of the left hinge 205B creates a horizontal axis for each rocker arm 303 to rotate around.

The right and left cradles 207A and 207B provide central ledges 206 and outer ledges 208, and the right and left hinges 205A and 205B provide a similar inside ledge 210 to trap their respective rocker arms 303 positioned therebetween and provide a side-to-side reference. In particular, the central ledges 206 work together to prevent lateral movement of the center rocker arm 303 as it rotates about the pivot pin 211. Similarly, each outer ledge 208 of the left and right cradles 207A and 207B work together with the adjacent inside ledge 210 of the right and left hinges 205A and 205B to prevent lateral movement of the respective right and left rocker arms 303 as they rotate about the pivot pin 211 (see FIG. 3).

For securing the control spring 305 to the housing 224, the top portion 230 includes a spring platform 256 having three holes 258, placement elements 260 and alignment elements 262. The platform 256 extends above the top portion 230 to a height being less than the height of each cradle portion 207A and 207B. The holes 258 are laterally separated from each other across the surface of the platform 256 and adapted to receive a securing element 309, such as threaded steel screw or rivet. The placement elements 260, along with the right and left alignment elements 262 provide front-to-back positioning of the control spring 305. The central alignment element 262 provides side-to-side positioning of the control spring 305. Consequently, the combination of the placement and alignment elements 260 and 262, together with the holes 258 of the platform 256 for receiving securing element 309, allows the base 321 of the control spring 305 to be securely attached to the top portion 230 of the housing 224 in all directions.

Any of the above components that extend from a portion 226–234 of the housing may be integrally formed with the housing 224 during the manufacturing process by a conventional method. In addition, the housing 224 and integrated components are made in the above embodiment with a hard resin material, for example a polycarbonate material having 12% carbon and 10% PTFE. From the following disclosure, a skilled artisan will appreciate that the spring pads 244 are not necessary for the operation of the invention. However, if used, the size and number of spring pads positioned within each slot may vary depending on the cartridge type that the magazine will contain. For the above embodiment, the pad would be between ⅛ and ¼ inch thick and made from a spring foam material, such as PORON being manufactured by Rogers Corporation of East Woodstock, Conn.

As illustrated in FIGS. 2A, 2B and 3, the control spring 305 of the CPM 301 generally includes a first and a second set of fingers 323A and 323B attached to the control spring base 321. The fingers 323A and 323B interact with each rocker arm 303 with the help of caps 325 and 331, respectively, and a guide pin 333. To better illustrate the differences between each set of fingers 323A and 323B and how they interact with the structure of the rocker arms 303, reference will now be made to FIGS. 4A and 4B. In particular, FIGS. 4A and 4B illustrate a detailed front perspective view of the control spring 305 and the rocker arms 303 in accordance with the present inventive embodiment.

Each set of fingers 323A and 323B of the control spring 305 provides a tapered shape to allow for a greater deflection of the finger 323A and 323B at a distal end adjacent the backside 236 of the housing 224. In the specific embodiment, the first set of fingers 323A are wider near the base 321 than the second set of fingers 323B so that the first set of fingers will provide a greater deflection force than the second set of fingers 303B. In addition, the first set of fingers 323A are bent to rest at a location above the control spring base 321, whereas the second set of fingers 323B are not bent and therefore rest along the plane nearly parallel with the control spring base 321.

Each finger 323A of the first set provides a pressure cap 325 at their distal ends to interact with a lift plate portion 327 of each rocker arm 303. Similarly, each finger 323B of the second set provides a guide cap 331 at their distal ends, however the guide cap 331 also includes a guide pin 333 located in a bottom portion of the guide cap 331. The guide pin 333 interacts with a guide path 335 of each rocker arm 303 (see FIG. 4B) to ultimately secure or eject a media cartridge (not shown) from a slot 240 of the magazine 201.

Figure 4B:
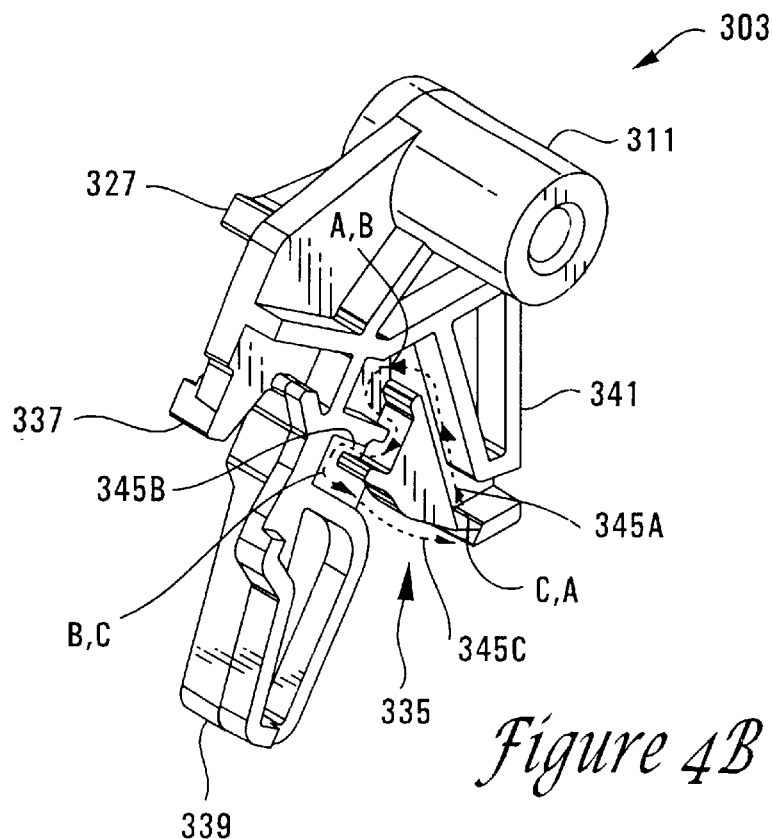
FIGS. 4A and 4B illustrate a detailed perspective view of the control spring and the rocker arm of the cartridge positioning mechanism illustrated in FIGS. 2 and 3.
Figure 4A:
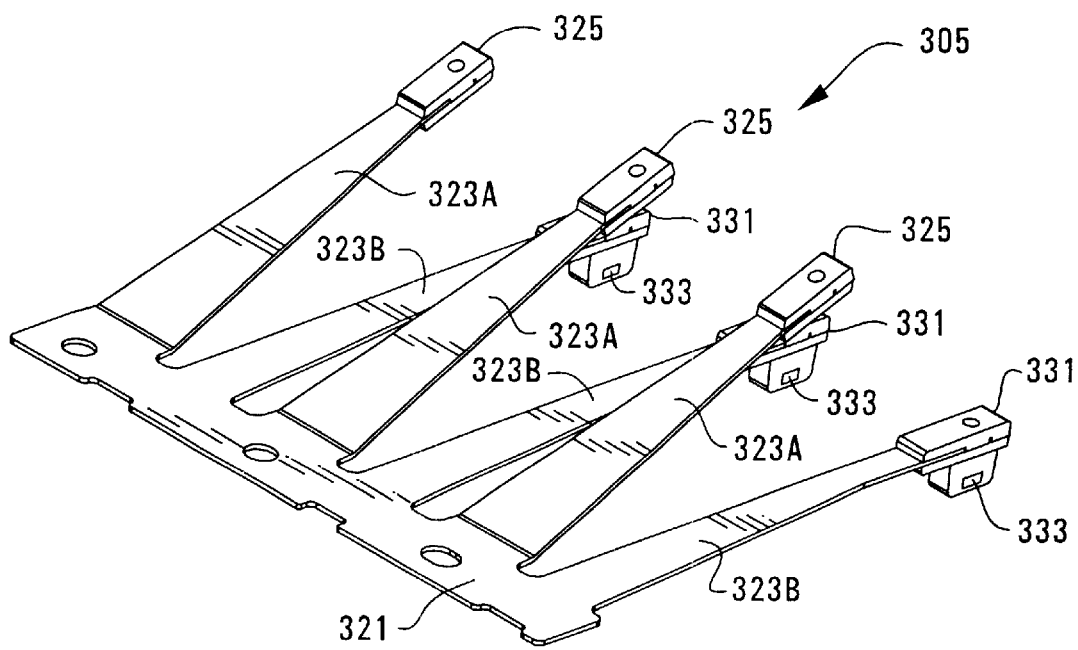

Referring now to FIG. 4B, a single rocker arm clearly illustrates the guide path 335 that interacts with the guide pins 333 of the second set of fingers 323B. In addition, the rocker arm 303 of FIG. 4B illustrates the lift plate portion 327 on a left side of the rocker arm 303; a lock tab portion 337, an ejection foot portion 339, and a body portion 341 portion on a right side of the rocker arm 303; and the sleeve portion 311 having a hole for receiving the rocker arm pin 209 from the right side to the left side, or visa versa, of the rocker arm 303. The above components may be integrally formed within each rocker arm 303 by a conventional molding technique. The skilled artisan should appreciate that each rocker arm 303 of the CPM 301 is identical to the other, therefore the following description of each component of a rocker arm 303 applies to all rocker arms 303 of the invention.

As illustrated, a trench in the body 341 of each rocker arm 303 forms the guide path 335. The guide path provides three distinct regions: receiving region 345A, securing region 345B and ejecting region 345C. Hash marks AB, BC, and CA through the dashed line having arrows clearly illustrates the start and end of each region.

As will be described in more detail below with reference to the process FIGS. 5A–5F, when the guide pin 333 moves into the receiving region 345A, the ejection foot 339 is in a fully extended position to indicate that a cartridge was just ejected or can be inserted into the associated slot 240. When the guide pin 333 moves into the securing region 345B, the ejection foot is nearly parallel with the back portion 236 of the housing 224 and the lock tab 337 is positioned to secure the media cartridge within the associated slot 240 of the magazine 201. Lastly, when the pin 333 is in the start of the ejecting region 345C, the lift cap 325 applies the greatest force upwards on the lift plate 327 to rotate the rocker arm 303 and move the contained media cartridge out of the associated slot 240. Once the media cartridge is removed, the guide pin 333 will move back into the receiving region 345A.

In the above embodiment, the lift caps 325 and guide caps 331 attach to the distal end of each finger 323A and 323B by a conventional over-molding process. The control spring 305 is made from a single sheet of 301 type stainless steel, hard or half-hard, that is approximately 0.635 millimeters thick. The use of stainless steel reduces the probability of the control spring 305 from failing due to fatigue. The pressure caps 325 and the guide caps 331 are made from a polycarbonate material having 30% glass and 15% PTFE, and the rocker arms 303 are made from a Nylon material having 30% glass and 15% PTFE.

The force that the fingers 323A and 323B may apply during operation will depend on their thickness, width and length. Consequently, the specific dimensions of the fingers 323A and 323B may vary for each type of media cartridge that the magazine is designed to contain. In one alternative embodiment, the first set of fingers 323A could be replaced with conventional compression springs. The compression springs could be secured between the lift tab 327 and the top portion 230 of the housing 224 using a known method.

Now that the structural features of the invention have been described, an example process for using the same will follow. For this example, FIGS. 5A–5F will illustrate a side cut-away view of the magazine 201 containing a conventional media cartridge 401 in a slot 240. Persons of ordinary skill in the relevant arts should appreciate that the following process steps would be applicable for any slot 240 of the inventive magazine 201.

The media cartridge 401 generally provides a front side 410, a back side 412, a top side 414, a bottom side 416. The top side 414 includes a trench 420 having a floor 422, a front wall 424, and a back wall 426. A conventional door mechanism 428 pivotally mounts within the cartridge trench 420 and rotates about an axis 430 to expose the media product of the cartridge 401 by a known method. Of course, the skilled artisan should appreciate that the door mechanism 428 can only be opened after the cartridge 401 has been removed from the magazine 201 by the user or a picker device of the autochanger 101 (see FIG. 1). Consequently, a lever arm 432 of the door mechanism 428 will always be positioned to have a portion resting against the back wall 426, as illustrated, to enclose the media product within the cartridge 401 being contained by a magazine slot 240.

Figure 5A:
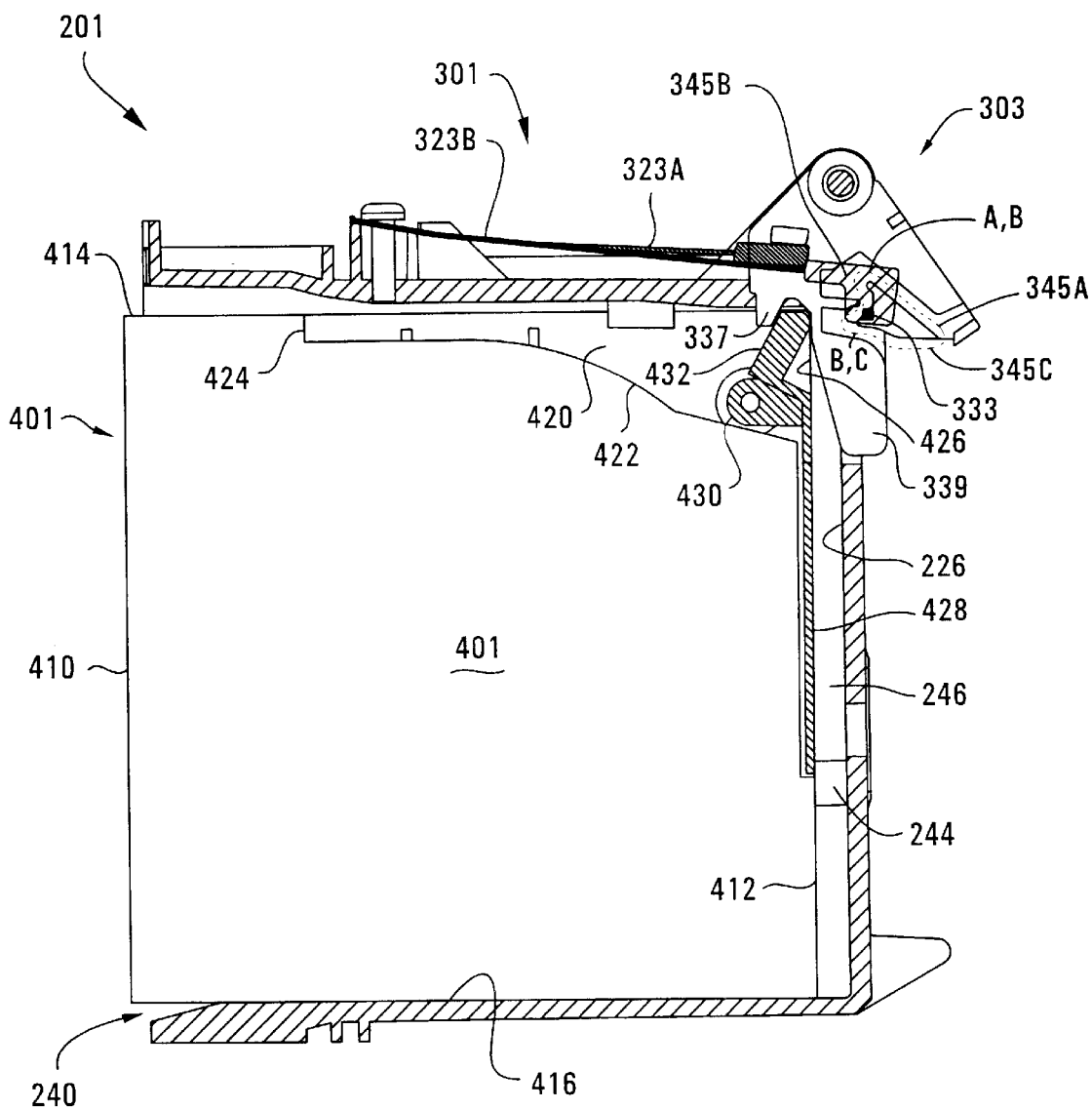
FIGS. 5A–5F illustrate a side cutaway view of the inventive magazine and cartridge positioning mechanism during the insertion and ejection process of a cartridge.

FIG. 5A illustrates the cartridge 401 being secured within a magazine slot 240. As indicated, the lock tab 337 resides within the trench 420 of the cartridge and surrounds the lever arm 432 to secure the cartridge 401 within the magazine 201. While the lever arm 432 is securing the cartridge, a gap 246 is created within the magazine slot 240 between the cartridge back side 412 and the interior wall of the magazine back portion 226. The cartridge 401 will move into this gap to compress the spring pad 244 only when the cartridge is to be received or ejected from the magazine.

Figure 5B:
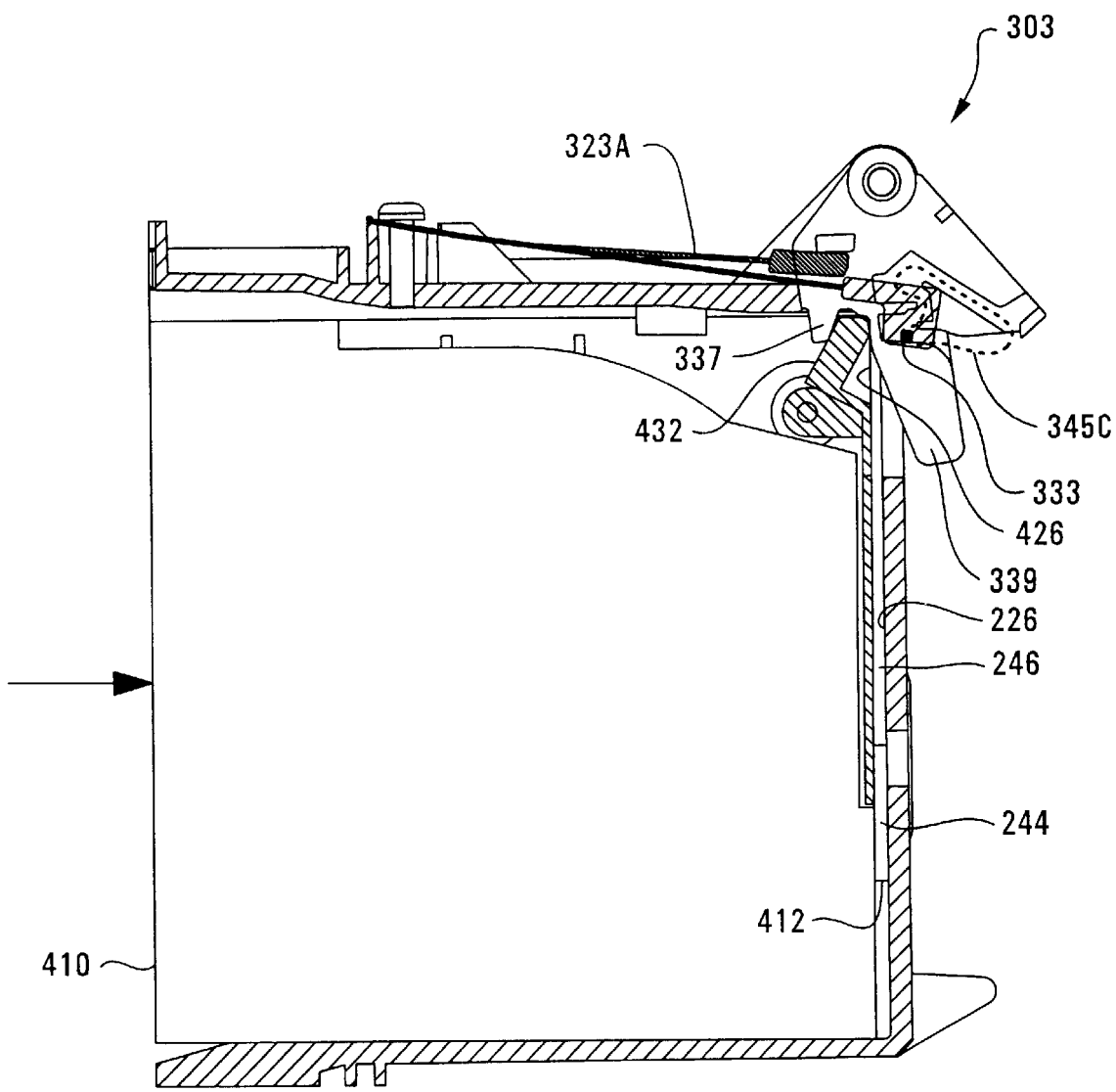

To release the cartridge from the magazine slot 240, the user pushes the cartridge 401 inward to reduce the gap and compress the spring pad 244 as illustrated in FIG. 5B. This movement of the cartridge rotates the rocker arm 303 in a counter-clockwise direction as the exterior surface of the cartridge back side 412 interacts with the ejecting foot portion 339. In addition, the logic pin 333 snaps down into the start of ejecting region 345C to unlock the media cartridge 401 from the magazine slot 240.

Figure 5C:
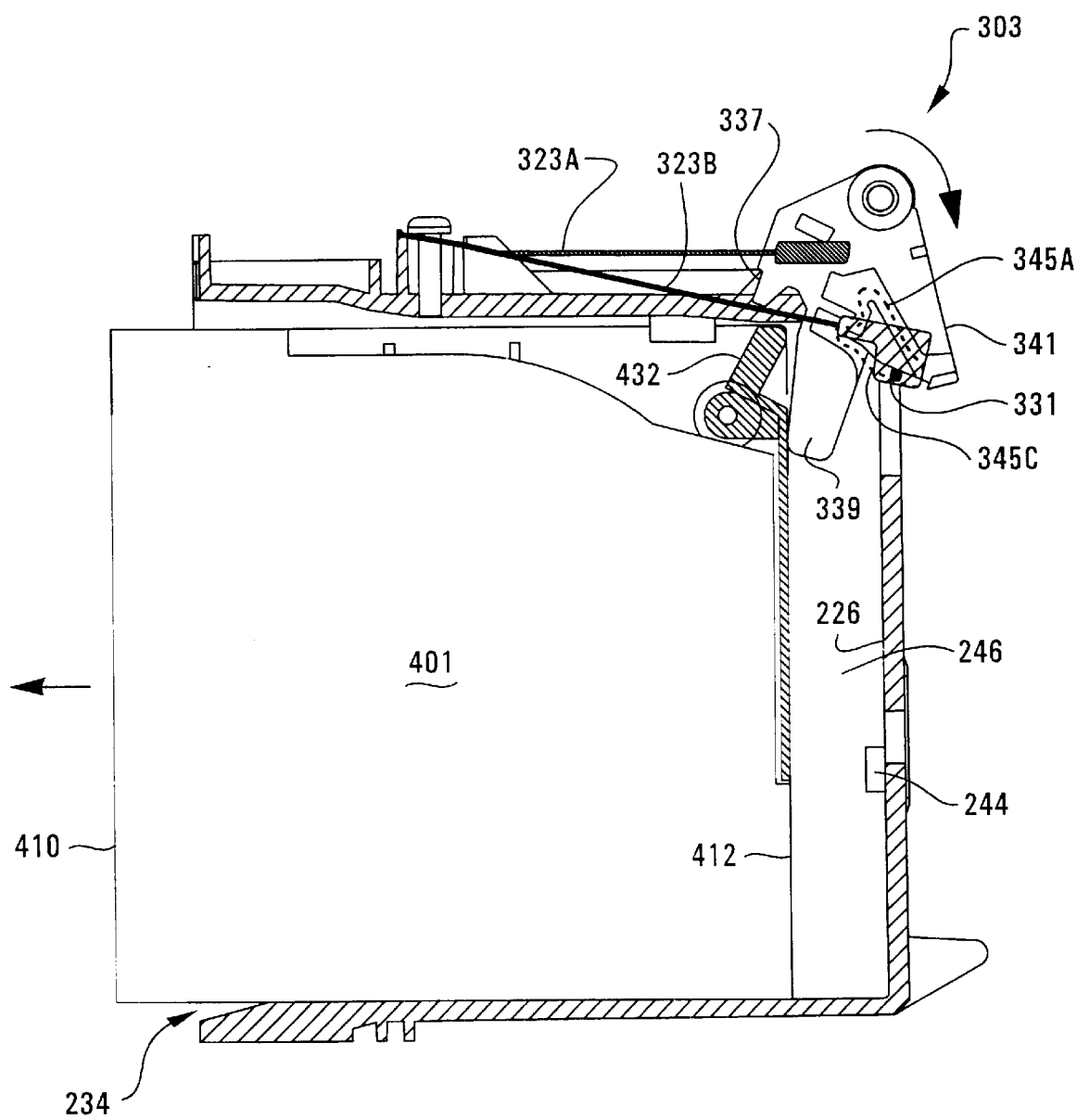

With the logic pin 333 within the ejecting region 345C, the lift spring 323A and the spring pad 244 are fully compressed and ready to apply a force that will rotate the rocker arm 303 in the clockwise direction. As illustrated in FIG. 5C, this rotation will also remove the lock tab 337 from around the lever arm 432 and thrust the ejecting foot 339 against the back side 412 of the cartridge 401 to move a portion of the cartridge outside of the magazine slot 240. During this step, the logic pin 333 moves through guide region 345C along an outside surface of the rocker arm body 341.

Figure 5D:
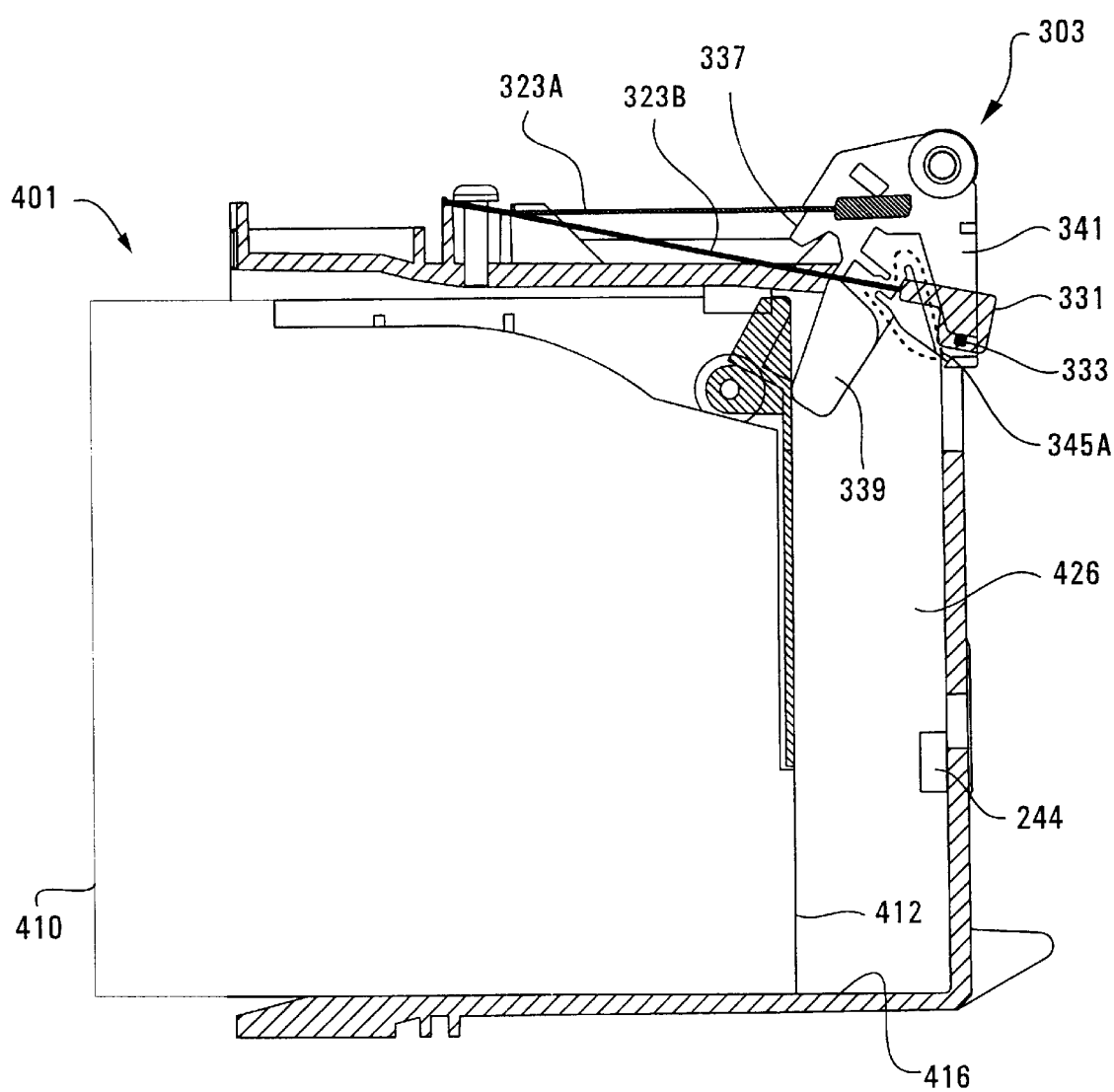

When the receiving region 345A captures the logic pin 333 in the body portion 341 of the rocker arm 303, the rocker arm 303 is fully rotated to position the cartridge front side 410 about 13/16 of an inch from the front portion 234 of the magazine as illustrated in FIG. 5D. At this point, the user can remove the media cartridge 401 with ease by grasping any surface of the cartridge and applying a slight force to overcome the frictional force between the cartridge and the bottom side 416 of the magazine.

As mentioned in the background of the invention, with a conventional magazine, the cartridge will typically extend out of a magazine only as far as indicated by FIG. 5A, and a 2 to 4 pound force would be necessary to overcome the restraining force that exists to secure the cartridge within the magazine at all times. With the present invention, once the cartridge has been ejected from the magazine as illustrated in FIG. 5D, not only does the user have nearly four times as much surface area to grasp onto the cartridge, but the process for removing will be effortless since the restraining force to secure the cartridge within the magazine was removed before being ejected.

Figure 5E:
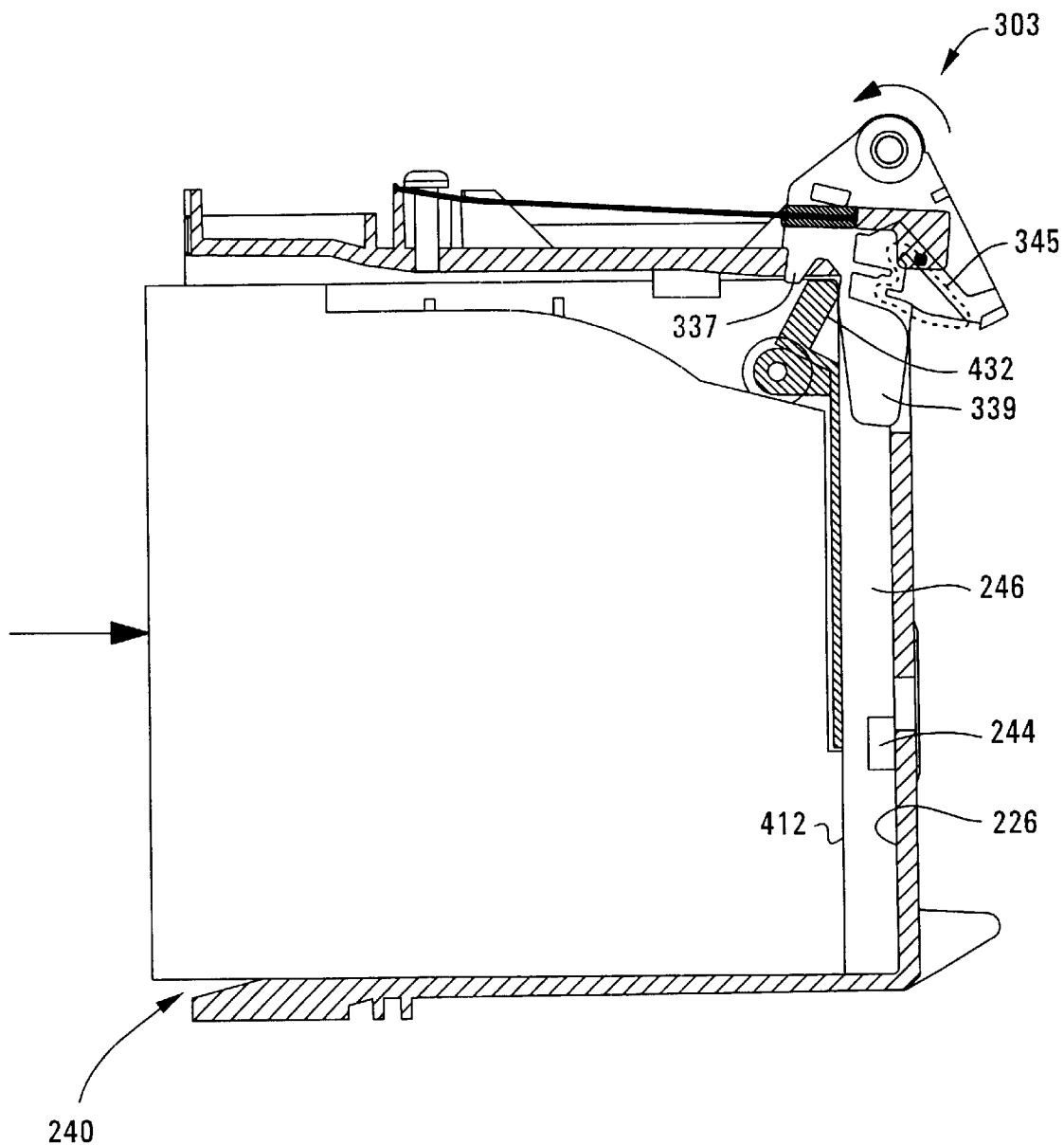

Referring now to FIG. 5E, the rocker arm 303 begins to interact with a cartridge 401 being inserted or received by a magazine slot 240. This insertion process rotates the rocker arm 303 in a counter-clockwise direction to slide the logic pin through the receiving region 345A and position the lock tab 337 over the lever arm 432.

Figure 5F:
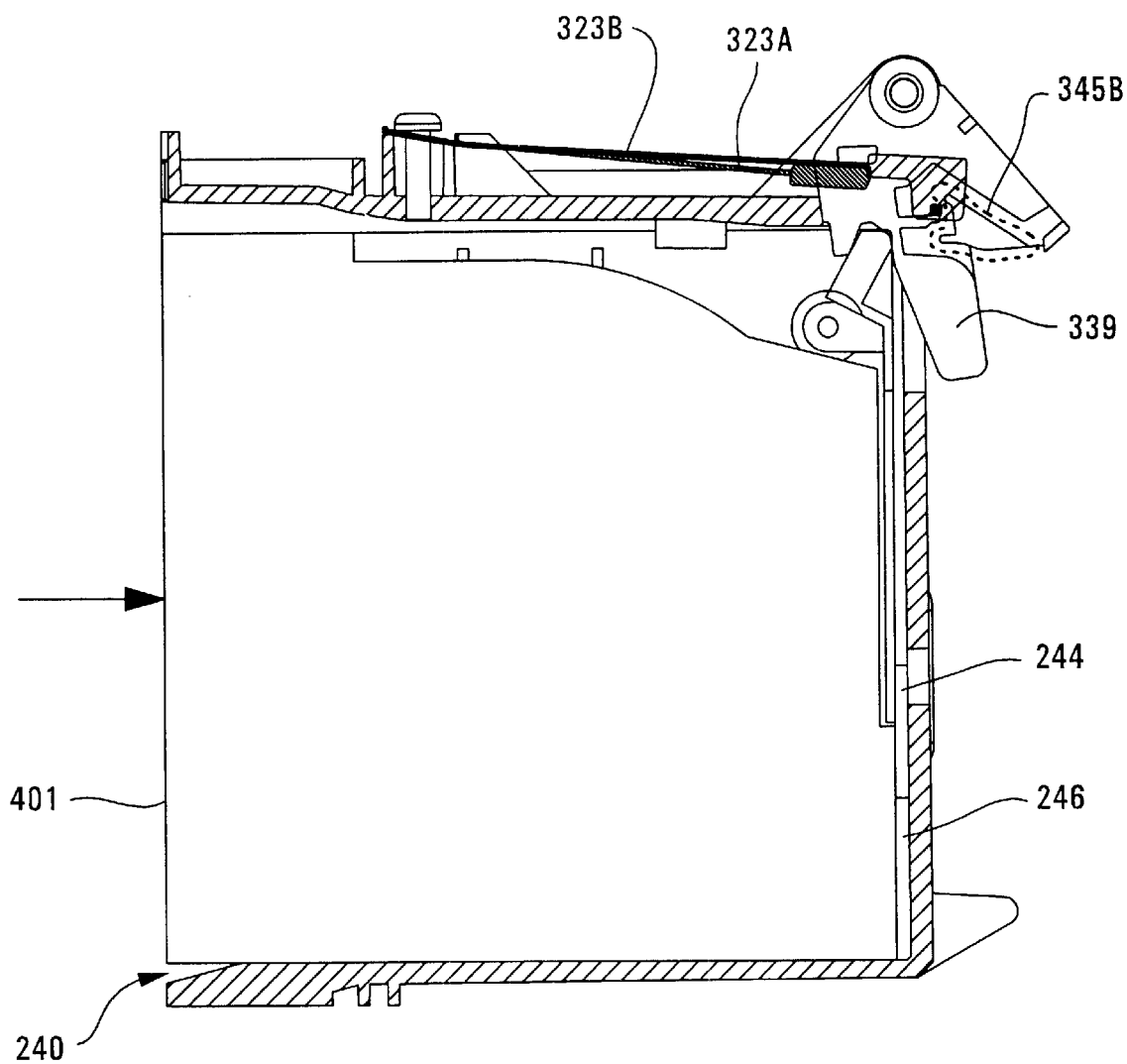

As the user fully inserts the cartridge 401 into the magazine slot 240 as indicated in FIG. 5F, the logic pin 333 moves into the securing region 345B, coming to rest on the intermediate ridge in the body portion 341 of the rocker arm 303. At this point the cartridge 401 has compressed the spring pad 244, and has fully rotated the rocker arm 303 causing the lift tab 327 to fully deflect the lift spring 323A. Once the insertion force on the cartridge 401 is removed, the lift spring 323A rotates the rocker arm 303 clockwise allowing the logic pin 333 to drop to rest on a ridge as indicated in FIG. 5A. At this point, the position of the lock tab 337 secures the media cartridge 401 within the magazine slot 240.

In summary, the magazine of the present invention uses a rocker arm 303 for each media cartridge slot 240 of the magazine 201, and a single over-molded leaf spring mechanism 305. The leaf spring includes two separate fingers for each media cartridge slot that can be secured to the magazine by three screws. The first finger provides a lift or force component to the rocker arm and the second finger utilizes the force component to guide the rocker arm through predetermined rotational positions so that a media cartridge can be received, secured and ejected by a slot of the magazine.

The rotational path of the rocker arm serves to create a "push/push" logic for receiving, locking and ejecting media cartridges with a media cartridge slot. This structure not only creates a force to restrain a media cartridge within a magazine but also adds a functional operation to eliminate the restraining force when the user wants to remove the media cartridge from a magazine slot. A total of ten parts are required with this magazine design, assuming the magazine would have three slots for receiving media cartridges. Therefore, savings in material cost, reliability, power to remove a cartridge, and assembly can be realized with the inventive magazine compared to other magazine structures. In addition, an ease of use is realized by this invention with the "push/push" logic to eliminate a restraining force when a cartridge needs to be removed from a magazine slot and to allow the user more of the media cartridge to grab on to in a very close and dark environment of an autochanger cavity having a fixed magazine.

What is claimed is:

1. An autochanger device having a cavity filled with a magazine, the magazine including a slot for containing a media cartridge, the device comprising:

a rocker arm pivotally coupled to a back portion of the magazine slot on a first surface and including:
        a guide path; and
        a lift tab;
    a control spring having a base coupled to a central region of the first surface and including:
        a lift finger extending from the base and interacting with the lift tab; and
        a guide finger extending from the base and interacting with the guide path, wherein the pivotal position of the rocker arm controls the location of the media cartridge within the magazine.

2. The autochanger of claim 1, wherein the lift finger applies a force to the lift tab to pivot the rocker arm.

3. The autochanger of claim 2, wherein the pivoting rocker arm moves a portion of the media cartridge out of the magazine slot.

4. The autochanger of claim 1, wherein the guide path further includes regions that control the pivotal position of the rocker arm as the guide finger interacts with the guide path.

5. The autochanger of claim 4, wherein the guide path regions may be selected from a receiving region, a securing region and an ejecting region.

6. The autochanger of claim 1, wherein the rocker arm further includes an ejection foot extending into the magazine slot to interact with an exterior surface of the media cartridge.

7. The autochanger of claim 6, wherein the ejection foot interacts with the media cartridge to receive the media cartridge of the slot when the guide finger interacts with a first region of the guide path.

8. The autochanger of claim 6, wherein the ejection foot interacts with the media cartridge to move the media cartridge out of the slot when the guide finger interacts with a second region of the guide path.

9. The autochanger of claim 1, wherein the magazine is mounted within the cavity of the autochanger more than six inches from an open end of the cavity.

10. The autochanger of claim 1, wherein the rocker arm further includes a lock tab extending into the magazine slot to interact with an interior portion of the media cartridge.

11. The autochanger of claim 10, wherein the lock tab secures the media cartridge within the magazine when the guide finger interacts with a third region of the guide path.

12. The autochanger of claim 1, wherein the lift finger and guide finger control the pivotal position of the rocker arm to restrain or eject a media cartridge being contained by the magazine.

13. The autochanger of claim 1, wherein the lift finger provides a force to pivot the rocker arm and the guide element moves through the guide path to control the pivotal position of the rocker arm.

14. The autochanger of claim 1, wherein the guide finger further includes a logic pin that moves through the guide path of the rocker arm to control the pivotal position of the rocker arm.

15. The magazine of claim 1, further includes a spring pad coupled within the magazine slot to provide a force as a cartridge is being inserted or ejected from the magazine.

16. A media cartridge magazine fixably mounted deep within a cavity of an autochanger comprising:

a rocker arm having a logic path, the rocker arm being coupled to the magazine at a pivot point;

a spring mechanism having a lift element and a logic finger, the lift element being coupled between the magazine and the pivot point and the logic finger being coupled between the magazine and the logic path, wherein the location of the logic finger within the logic path controls the position of a media cartridge within the magazine.

17. The magazine of claim 16, wherein the lift element rotates the rocker arm about the pivot point when the guide finger reaches a specific region of the logic path.

18. The magazine of claim 16, wherein the logic path includes a securing region, an insertion region, and an ejecting region.

19. The magazine of claim 16, wherein the rocker arm rotates about the pivot point to move the rocker arm into and out of the magazine to interact with the media cartridge.

20. The magazine of claim 16, wherein rocker arm further includes an ejecting foot to move a portion of the media cartridge out of the magazine.

21. The magazine of claim 20, wherein the ejecting foot moves the media cartridge portion out of the magazine when the logic finger location is within an ejecting region of the logic path.

22. The magazine of claim 16, wherein the rocker arm further includes an ejecting foot to receive the media cartridge being inserted into the magazine.

23. The magazine of claim 22, wherein the ejecting foot receives the media cartridge into the magazine when the logic finger location is within a receiving region of the logic path.

24. The magazine of claim 16, wherein the rocker arm further includes a lock tab to secure the media cartridge within the magazine.

25. The magazine of claim 24, wherein lock tab secures the media cartridge within the magazine when the logic finger location is within a securing region of the logic path.

26. The magazine of claim 16, wherein the lift element is a spring.

27. A method for securing and ejecting a media cartridge within a magazine, the cartridge having a pivotal door and a tab for opening the door, the method comprising:

positioning the cartridge within a portion of the magazine to interact with a rocker arm being pivotally coupled to the magazine and having a guide path, the magazine also includes a spring mechanism coupled between the magazine and the rocker arm and having a lift element and a guide finger; and applying a force to the cartridge to rotate a distal end of the rocker arm and move a portion of the guide finger into a first region of the guide path so that the lift element applies a force to pivot the rocker arm.

28. The method of claim 27, further including the step of ejecting a portion of the cartridge to an area outside of the magazine cavity as the force applied by the lift element pivots the rocker arm.

29. The method of claim 27, further including the step of positioning a lock tab around the cartridge tab to secure the cartridge within the magazine as the force applied by the lift element pivots the rocker arm.

* * * * *